May 12, 1970     A. C. FIELEK, JR     3,511,542
SKID CONTROL SYSTEM INCLUDING CONTROL CIRCUIT FOR
A HYDRAULIC MODULATING VALVE

Filed Jan. 2, 1968     3 Sheets-Sheet 1

INVENTOR.
Anthony C. Fielek, Jr.
BY
*Harness, Dickey & Pierce*
ATTORNEYS

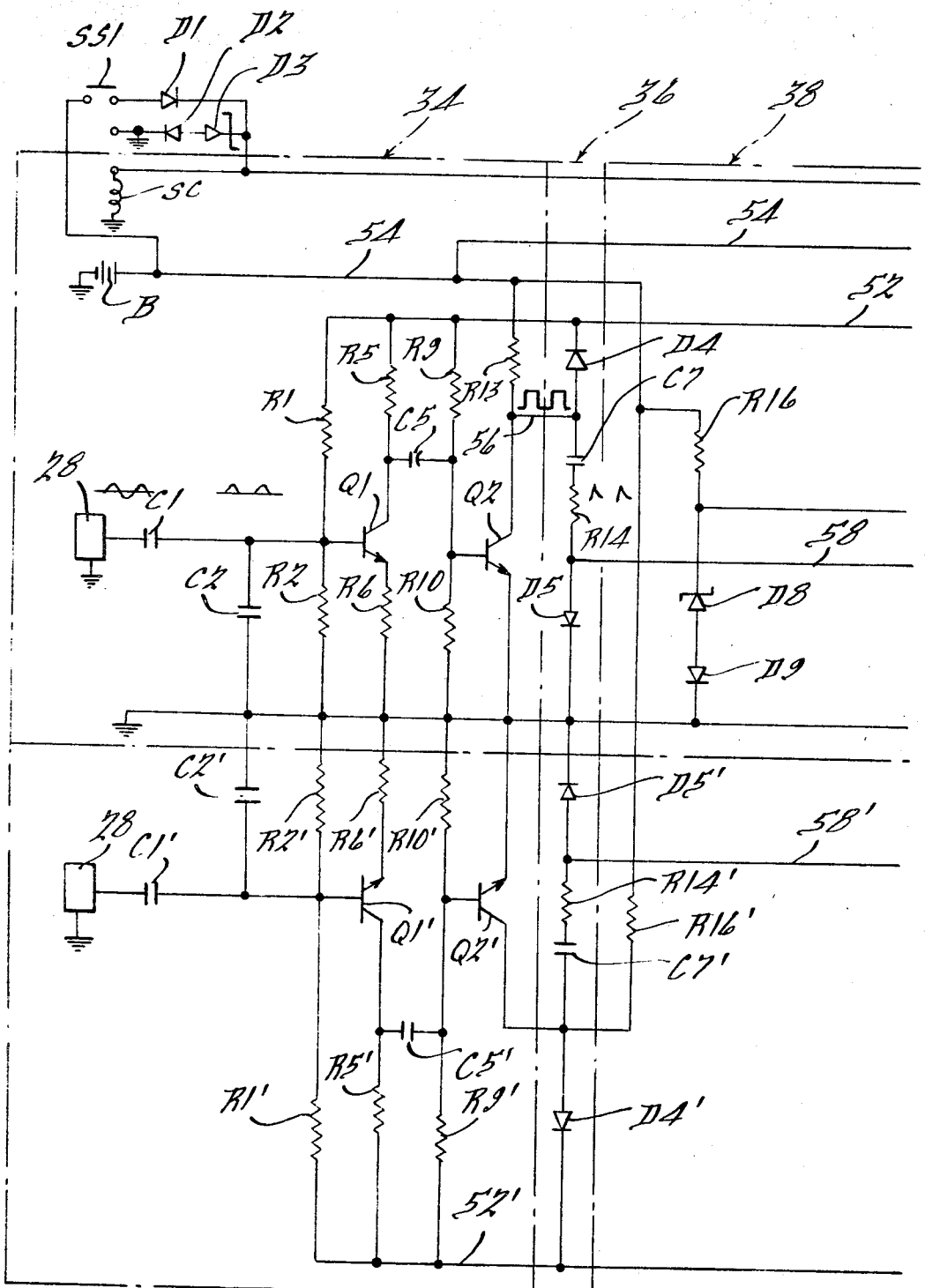

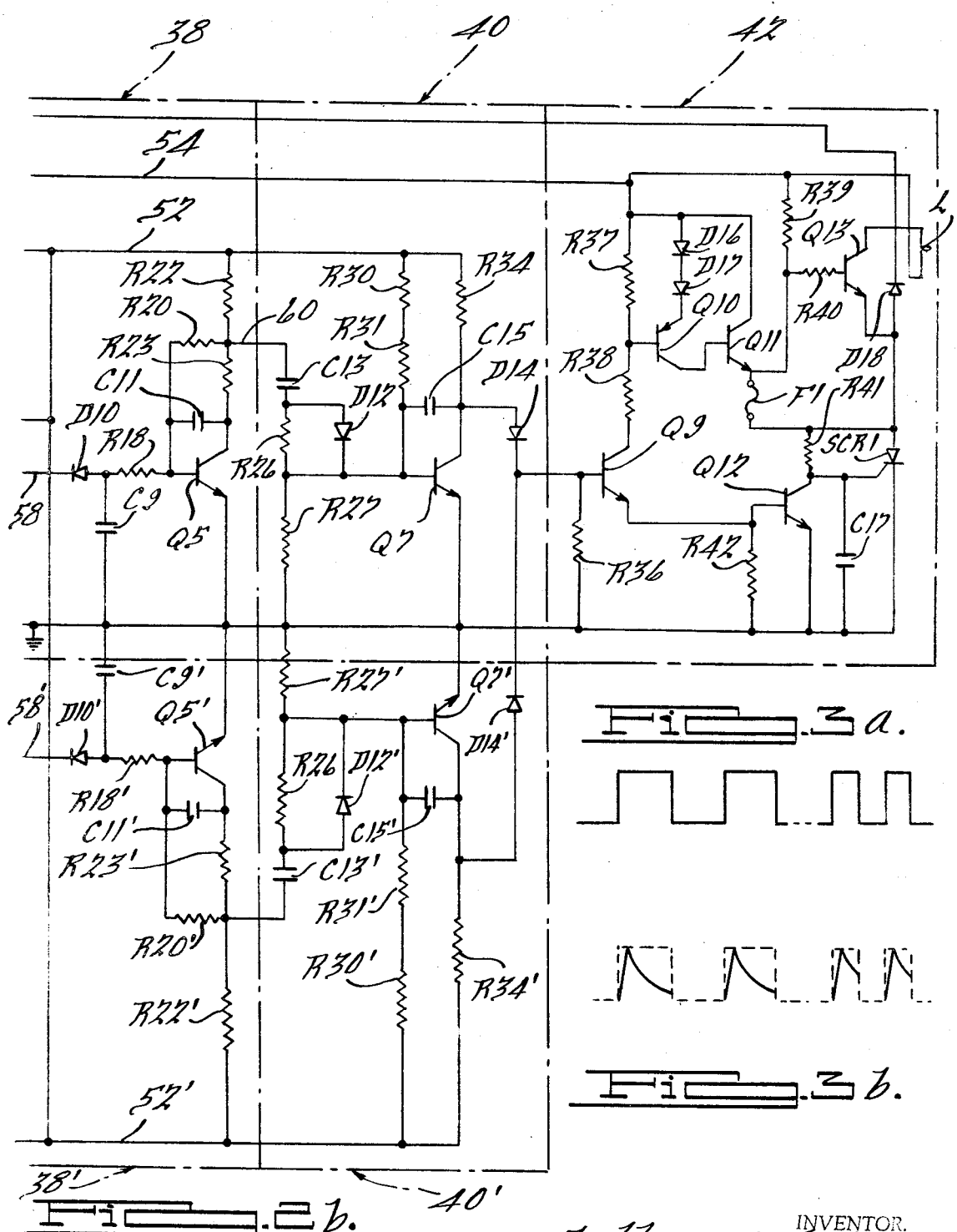

United States Patent Office 3,511,542
Patented May 12, 1970

3,511,542
SKID CONTROL SYSTEM INCLUDING CONTROL CIRCUIT FOR A HYDRAULIC MODULATING VALVE
Anthony C. Fielek, Jr., Dearborn, Mich., assignor to Kelsey-Hayes Company, Romulus, Mich., a corporation of Delaware
Filed Jan. 2, 1968, Ser. No. 695,005
Int. Cl. B60t 8/08
U.S. Cl. 303—21                                    22 Claims

ABSTRACT OF THE DISCLOSURE

A skid control system for fluid actuated brakes of a wheeled vehicle including a modulating valve for modulating the fluid pressure to the fluid actuated brakes and a control circuit for actuating the valve. Actuation of the skid control circuit is varied over the velocity range of the wheel so that at higher angular wheel velocities skid control action is initiated at higher deceleration rates than at lower angular wheel velocities.

---

The present invention relates to skid control systems, and more particularly relates to a skid control system including a novel control circuit.

It is an object of the present invention to provide a novel skid control system for controlling the brakes of the wheels of a wheeled vehicle.

It is another object of the present invention to provide a novel control circuit for use in a skid control system for controlling the brakes of the wheels of a wheeled vehicle.

It is another object of the present invention to provide a novel skid control system for fluid actuated brakes for wheels of a wheeled vehicle including a novel control circuit for actuating a modulating valve for modulating or controlling the pressure to the brakes in response to an electrical signal indicating the occurrence or the imminence of a wheel skid condition.

In conventional skid control systems, actuation of skid control apparatus is made independently of the velocity of the vehicle. It has been found desirable, however, to vary the response or time of actuation of the system with the velocity of the vehicle. Therefore, it is another object of this invention to provide a skid control system having its response modified in accordance with the vehicle velocity.

Other objects, features and advantages of the present invention will become apparent from the subsequent description and the appended claims, taken in conjunction with the accompanying drawings, in which:

FIG. 1 is a generally schematic diagram of a skid control system embodying features of the present invention;

FIGS. 2a and 2b together (side by side) are a schematic diagram of an electrical control circuit of the present invention;

FIG. 3a is a curve showing the square wave output for different frequencies from the squaring circuit;

FIG. 3b is a curve showing the wave shape from the square wave output of different frequencies from the signal shaping and limiting circuit;

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle. The system of the present invention is generally an improvement on the system shown and described in the copending U.S. patent application to Every et al., No. 642,861, filed June 1, 1967 and that disclosure is incorporated herein by reference.

Figure 1:
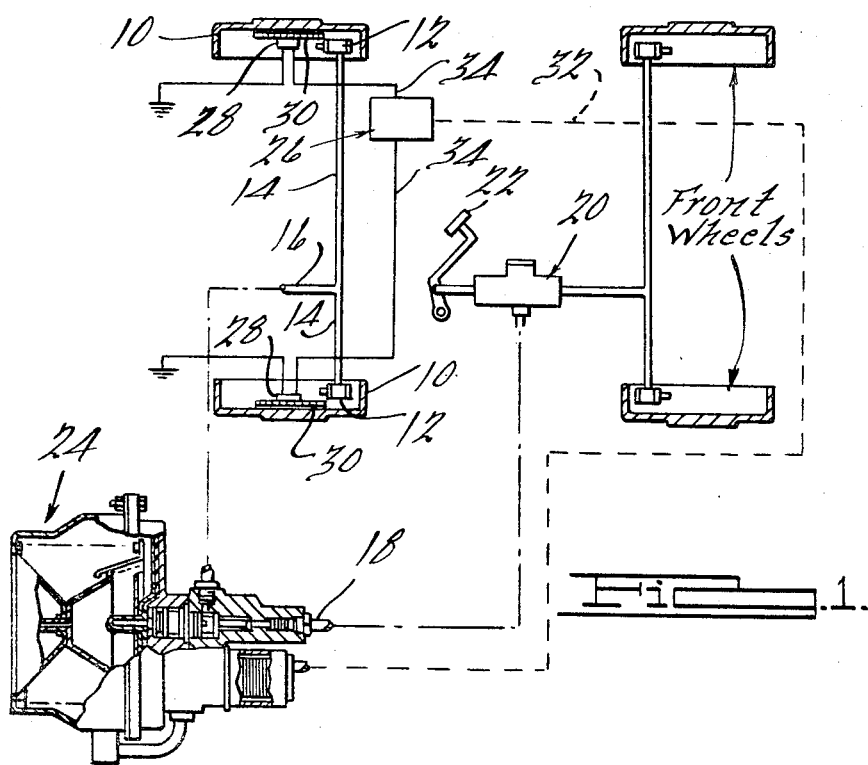

Looking now to FIG. 1, the schematic diagram generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connnected between the fluid lines 18 and 16, and hence the modulating valve 24 can control the fluid pressure to the wheel brake cylinders 12 and hence can control the operation of the brakes. The brakes associated with the brake drum 10 can be of a conventional construction and hence the details thereof have been omitted for the purposes of simplicity. The modulating valve 24 can be of the type shown and described in the copending patent application of Every et al. (supra) and the details thereof have been omitted for purposes of simplicity.

The modulating valve 24 in the present system is actuated in accordance with an electrical signal obtained from an electrical control module 26. The control module 26 receives information from sensors 28 associated with each of the brake drums 10 by means of exciter rings 30. The sensors 28 can be of constructions known in the art and since the specific details thereof do not constitute a part of the present invention they have been omitted for the purposes of simplicity. The exciting rings 30 can be of a toothed construction and the sensors 28 can be of a permanent magnet or electromagnetic construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid control existing or to be occurring at the wheels associated with drums 10. The output or control signal will be transmitted by means of conductor 32 to the modulating valve 24. The average angular velocity for a pair of rear wheels driven by a prop shaft through an axle assembly can be obtained by sensing the angular velocity of the prop shaft. The advantages of the present invention are obtained when either a direct signal is obtained from the wheels or when a signal of wheel angular velocity is obtained from the prop shaft. In the system of the present invention the control module 26 can provide merely an "on" or "off" signal and modulation of the fluid pressure to the brake cylinders 12 will be provided by the modulating valve 24.

A control modulator circuit 26 is shown in FIGS. 2a and b and comprises a squaring circuit section 34, a signal shaping and limiting circuit 36, an integrating circuit section 38, a gate circuit section 40, and an output circuit section 42 (all of which are shown in dot-dash lines). The sections 34, 36, 38 and 40 are for use to be connected with one of the sensors 28 for one of the rear wheels of a vehicle. Sections 34′, 36′, 38′, and 40′ are similar to their corresponding sections 34–40 and are connected to the other sensor 28 of the other rear wheel. Both groups of sections (34–40 and 34′–40′) are connected to a common output section 42. Since the circuit sections 34 through 40 are identical to the circuit sections 34′ through 40′, only the details of sections 34–40 will be described. In the sections 34′–40′ components similar to like components in corresponding sections 34–40 have been given the same numerical and letter designations with the addition of a prime.

In operation, the squaring circuit section 34 receives the information from one of the sensors 28, which is generally in the form of a sine wave; the sine wave input is rectified (half-wave) and then amplified in the squaring circuit section 34; the output signal from the section 34 is limited in amplitude whereby a constant amplitude square wave is provided. The frequency of the square wave is the same as the frequency of the input sine wave and hence will be proportional to the angular velocity of the wheel associated with the particular sensor 28. The square wave is then fed in the input of the signal shaping circuit section 36.

The square wave is shaped in a selected manner resulting in an output wave to be described in detail later. Generally the time constant of an RC circuit is made to be of a sufficiently long duration such that the capacitor will not completely charge over the time period equal to the pulse width of the square wave. This provides for a signal which is non-linear with frequency which serves a purpose to be described. The shaped output is then fed into the input of the integrating circuit section 38.

The section 38 integrates the shaped signal and provides an output signal which is generally DC (see FIG. 4) and which has a magnitude varying and generally increasing with an increase in the frequency of the shaped wave and hence increasing with the angular velocity of the wheel. The parameters of the integrating circuit section 38 are selected to complement the shaped wave received whereby the magnitude of the DC output (see FIG. 4), is generally non-linear with respect to angular wheel velocity. The output from the integrating circuit section 38 is then fed into the gate circuit section 40.

In general, the gate circuit section 40 includes means for providing a fixed threshold representative of a preselected magnitude of deceleration rate; at the same time the gate circuit section 40 differentiates the DC output wave (see FIG. 4) from the integrator circuit section 38 to provide a deceleration signal which is an indication of the rate of change of the voltage of the DC output wave and hence of the rate of change of the wheel angular velocity. Actuation occurs when a signal of a preselected magnitude relative to the threshold occurs. In the apparatus of the present invention actuation of the skid control circuit is varied over the velocity range of the wheel such that at higher angular wheel velocities skid control action is initiated at higher deceleration rates than at lower angular wheel velocities. It has been found that skid control operation is improved over the total range of expected vehicle speeds when actuation is varied with velocity such that higher deceleration rates are required for actuation at high speeds than at low speeds. This is accomplished by the non-linearity of the DC output wave (FIG. 4), which at higher angular wheel velocities flattens out, requiring actually a higher deceleration rate at the wheel at higher velocities to actuate the skid control unit than at lower wheel velocities. Since the DC output wave is not linear and is not a proportional indication of the wheel velocity, the deceleration signal also will not be a proportional indication of the vehicle wheel deceleration. As noted the departure from linearity and hence proportionality is most pronounced at the high velocity end of the curve (FIG. 4) and serves a purpose to be described. The deceleration signal is operative with the threshold potential which has been preselected and will provide for an output signal when the deceleration signal reaches a preselected magnitude indicative of an excessive deceleration of the vehicle wheel in question. Because of the non-linearity noted this magnitude of the "excessive deceleration" necessary to provide the output signal will vary with velocity and a greater wheel deceleration will be required to cause the output signal at higher velocities than at lower velocities. The output signal from the gate circuit section 40 is then connected to the output circuit 42 such as to provide an appropriate signal for actuating the modulating valve 24 in the manner described in the copending application to Every et al. (supra). The details of the individual circuit sections will now be described.

SQUARING CIRCUIT SECTION 34

The wheel sensor 28 is connected to the base of an NPN transistor Q1 via a coupling capacitor C1; the base of Q1 is connected to ground via capacitor C2; C2 is used to bypass high frequency noise from the input of the base of Q1. The base of Q1 is biased to drive Q1 generally into saturation by means of serially connected resistors R1 and R2 with R2 being connected from the base of Q1 to ground and R1 being connected from the base of transistor Q1 to a regulated line 52. The emitter-collector circuit of transistor Q1 provides a generally square wave amplified output. A load resistor R6 is connected from the emitter of Q1 to ground while resistor R5 is connected from the collector of Q1 to the positive voltage line 52.

The output from the transistor Q1 is connected to the input of a second NPN transistor Q2, which is also biased to saturation resulting in an amplified square wave of improved shape output (as shown at the collector). The base of transistor Q2 is connected to ground via a biasing resistor R10 and is also connected to the conductor 52 by a biasing resistor R9. The output from Q1 is connected to the base of Q2 by capacitor C5, which is connected between the collector of Q1 and the base of Q2. The emitter of Q2 is connected directly to ground while the collector of Q2 is connected to the positive side of a battery B via line 54 through a resistor R13. The transistors Q1 and Q2 provide a square wave of a substantially constant amplitude having a frequency equal to the frequency from the input sensor 28 and hence having the frequency proportional to the angular wheel velocity. A diode D4 has its cathode connected to the positive, regulated direct potential line 52 and its anode connected to the collector of Q2 and limits the amplitude of the square wave to generally the potential of line 52. The circuit section 34 acts as a limiter and will provide for an output of constant amplitude despite variation in amplitude of the signal from sensor 28. The output from the transistor Q2 is connected to the input of the signal shaping circuit section 36 via the conductor 56 which is connected from the collector of the transistor Q2.

SIGNAL SHAPING CIRCUIT SECTION 36

Figure 4:
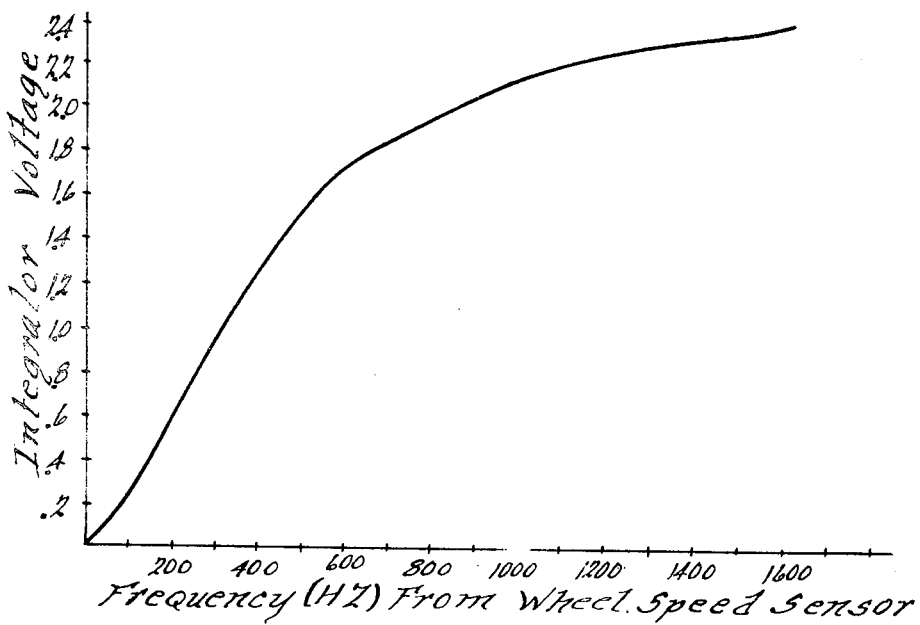
FIG. 4 is a graph showing the variation of control signal with vehicle speed.

The conductor 56 connects the output of the circuit section 34 to the input of the signal shaping circuit section 36. The circuit section 36 includes a capacitor C7 serially connected from conductor 56 to one side of a resistor R14 with the opposite side of R14 connected to ground via a diode D5 which has its cathode connected to ground. The parameters of the RC time constant of the circuit section 36 are selected to provide an output at R14 varying with frequency. The RC time constant of the circuit, including the capacitor C7, is provided to be greater than the time period for one half cycle of the input square wave. The wave forms occurring at the output of the signal shaping circuit section 36 at conductor 58 are shown in FIG. 3b. Conductor 58 is connected at the juncture of resistor R14 and diode D5 and connects the output from the wave shape circuit section 36 to the integrating circuit section 38. Since each square wave at (see FIG. 3a) the input will be generally of the same shape (i.e. amplitude and rise time characteristics) regardless of frequency, the output wave shape would generally appear the same regardless of frequency. Because of the relatively long time constant of the circuit, the shaped output wave at R14 (see FIG. 3b) has a substantial trailing edge which gradually decreases in amplitude. Since the voltage across R14 is proportional to the current through capacitor C7, the area under the voltage curve generally indicates the charge attained by the capacitor. Since at higher frequencies of the square wave (FIG. 3a) more of the trailing edge of the output voltage (FIG. 3b) is cut-off, it follows that the total charge or final potential attained by capacitor C7 will decrease with increase in frequency. At low frequencies a change in the width of the trailing edge will not affect the total area under the curve represented by the shaped wave as much as at higher frequencies. The net result is a non-linear reduction in the area under the curve with increasing frequency which in turn contributes to the non-linearity of the DC output wave (FIG. 4). The output from the shaping circuit section 36 is connected to the input of the integrating circuit section 38 by the conductor 58.

INTEGRATING CIRCUIT SECTION 38

In the integrating circuit section 38 the shaped output pulses are integrated such that the integrated wave will be generally proportional to the area under the curve of the shaped wave relative to the total period of the wave. The output conductor 58 is connected to the input of the integrating circuit section 38 via a diode D10 which has its cathode connected to conductor 18 and its anode connected to the base of an NPN transistor Q5 via a dropping resistor R18. A capacitor C9 is connected from the juncture between resistor R18 and diode D10 and ground. The capacitor C9 and its associated circuitry comprise an integrator, with the magnitude of the charge on or potential across C9 representing the frequency of occurrence of the shaped waves at the conductor 58 and hence representing wheel angular velocity. The capacitor C9 is charged from the source of potential at conductor 52 to the potential at the base of transistor Q5 which normally is biased to saturation and hence the normal potential at the base of Q5 and hence at capacitor C9 will be of low magnitude and positive. On the positive half cycles of the square wave (FIG. 3a) the diode D5 will be conductive and diode D10 will be non-conductive; during these half cycles C7 is charged and C9 discharges through the base circuit of Q5. On the alternate half cycles (zero potential, see FIG. 3a), the diode D5 is non-conductive and diode D10 is conductive and some of the charge from C7 is transferred to C9 driving C9 negative; the charge time of the circuit of C9 is faster than the discharge time and hence the average charge on C9 will increase with frequency. The amount of charge transferred to C9 will be determined by the charge or potential at C7. With a short charge time constant for C7, C7 would be charged to the same potential regardless of the frequency of the square wave (over the frequency range used). In this situation the potential or charge on C9, as determined by the charge transferred from C7, would tend to vary linearly with frequency. However, as noted, C7 has a relatively long charge time constant and as a result of cutting the trailing edge will be charged to lower potentials with increases in frequency; this in turn will provide for a reduction in charge transfer to C9 with increasing frequency (as compared to the situation if C7 were always charged to the same potential) resulting in a non-linear variation in potential (or change) across C9 with frequency. The result is a signal appearing at the base of the transistor Q5 which will vary with the angular wheel velocity.

The transistor Q5 and its associated circuitry are connected as a Miller integrator amplifier with the transistor Q5 having its emitter connected to ground and with its collector connected to the positive voltage line 52 via serially connected resistors R22 and R23. A capacitor C11 is connected from the collector of transistor Q5 to the base, while a resistor R20 is connected from the juncture of resistors R22 and R23 to the base of transistor Q5. The capacitor C11 and its associated circuitry provide an additional integrating function whereby a relatively smooth output potential is provided at output conductor 60. Note that Q5 is normally saturated and hence the potential at conductor 60 will be a positive, minimum potential; however, as C9 becomes more negative (with increasing frequency) Q5 conducts less and the potential at conductor 60 will increase. Thus the signal at conductor 60 will vary with the potential at C9; since the potential at C9 varies non-linearly with frequency. The resultant output wave appearing at conductor 60 is shown in FIG. 4. Note that in the wave shown in FIG. 4, at low frequencies or low angular wheel velocities, i.e., from 0 to 600 hertz, the output is generally linear; however, at wheel speeds resulting in an input frequency of over 600 hertz, a pronounced non-lineartiy occurs. The conductor 60 is connected to the input of the gate circuit section 40. A regulated directed potential is provided at conductor 52. The conductor 54 from the positive side of the battery B is connected to the conductor 52 via a dropping resistor R16. Voltage regulation is provided by a pair of diodes D8 and D9, which are connected back to back and are connected from the connecting conductor 52 to ground with diode D8 being a Zener having its cathode connected to the conductor 52 and diode D9 having its cathode connected to ground.

GATE CIRCUIT SECTION 40

The gate circuit section 40 includes a differentiating circuit and hence has a capacitor C13 connected from the conductor 60 to ground via serially connected resistors R26 and R27. A diode D12 acts as a clamp and is connected across the resistor R26 with its anode connected to the capacitor C13. An NPN transistor Q7 has its base connected to the juncture of resistors R26 and R27 and has its emitter connected to ground. The transistor Q7 is biased by means of a biasing circuit including serially connected resistors R30 and R31 connected between the positive voltage conductor 52 and its base. The values of resistors R30 and R31 relative to the other parameters of the circuit are selected such as to provide for a selected bias at the base of transistor Q7 maintaining transistor Q7 normally off. Q7 will be maintained off until the potential at the base as provided by the differentiating circuit including capacitor C13 attains a magnitude sufficient to overcome the cut-off or threshold bias set by the resistors R30, R31, etc. The threshold bias is selected to represent a preselected magnitude of wheel deceleration below which the wheels are decelerating at an acceptable rate and above which the wheels are decelerating at an undesirable rate; in the latter case an output signal is provided whereby the modulating valve is actuated and skid control action occurs.

The transistor Q7 has its collector connected to the conductor 52 via a resistor R34 and a coupling capacitor C15 is connected between its base and collector. For normal, acceptable wheel decelerations the threshold voltage at the base of transistor Q7 will not be exceeded by the output of the differentiating circuit including the capacitor C13. However, in the event of excessive deceleration occurring, i.e., as in an incipient skid condition, the differentiated signal at the base of transistor Q7 will be sufficient to exceed the threshold thereby driving Q7 into conduction resulting in an output gate signal, which in turn results in cycling of the modulating valve member 24. Looking to the curve of FIG. 4, it can be seen that at lower frequencies at which the integrated output at conductor 60 is generally linear with respect to wheel angular velocity, the rate of change of wheel velocity required to provide a signal of sufficient amplitude to trigger the transistor Q7 will be less than that at the flat part of the curve which corresponds to higher wheel velocities, i.e. over 600 cycles per second. Where there is no appreciable slip, vehicle speed is related to wheel speed. Thus at 30 m.p.h. of the vehicle the curve of FIG. 4 will be at a corresponding point at around 490 hertz. At this point on the curve an angular deceleration rate of the wheel of around 35–40 ft./sec.$^2$ is required to provide a signal of sufficient amplitude to trigger Q7 and initiate skid control; however, at 90 m.p.h. of the vehicle (corresponding to 1470 hertz) an angular deceleration of the wheel of around 150–200 ft./sec.$^2$ is required to provide a signal of sufficient amplitude to trigger Q7 and initiate skid control. Note that the curve of FIG. 4 and the deceleration rates noted resulted in desirable skid control actuation; while vehicles having different braking systems and varying in weight, suspension, and other characteristics will require different operating curves, such as the curve of FIG. 4, still the provision of substantial non-linearity is desirable for skid control actuation. The effect of the non-linearity is to cause a greater delay (referred to as "on-time" delay), in the conduction of the transistor Q7 at higher angular wheel velocities and hence a greater delay in the cycling of the modulating valve 24. It has been found that this delay or non-linearity is desirable and provides for better stopping distances at higher wheel speeds than when a linear response is used. The output from the gate section 40 is transmitted to the output section 42.

OUTPUT CIRCUIT SECTION 42

The output from the transistor Q7 is connected to the input of the output circuit section 42 via a diode D14 which has its anode connected to the collector of transistor Q7. Note that the output from the diode D14' of gate section 40' is connected to the same point as diode D14 in the output circuit section 42 whereby that section will be responsive to signals from either of the rear wheels. The cathode of diode D14 (D14') is connected to ground via a load resistor R36. R36 is in the base circuit of transistor Q9 (normally non-conductive) which is of the NPN type and has its collector connected to the plus side of the battery B via conductor 54 via serially connected resistors R37 and R38. The emitter is Q9 is connected to ground via a resistor R42. A PNP type transistor Q10 has its base connected between the juncture of resistors R37 and R38 and is turned on when Q9 is turned on, i.e., the potential at the base of Q10 being lowered upon conduction of Q9. Q10 has its emitter connected to the plus side of the battery B via conductor 54 via a pair of serially connected diodes D16 and D17 which are connected in forward conducting condition to conduct current through the emitter-collector circuit of Q10. Transistor Q10 is used to control the conduction of an NPN power transistor Q11 which has its base connected to the collector Q10 and which has its collector connected to the plus side of battery B, via conductor 54. The emitter of transistor Q11 is connected through a fuse F1, through a forwardly connected diode D18 to the solenoid coil SC of the modulating valve 24; coil SC has one side connected to ground. Transistors Q9, Q10, and Q11 are normally non-conductive; Q9 will be rendered conductive by the output signal from gate section 40 at its base; Q10 will be rendered conductive upon conduction of Q9 and power transistor Q11 will be rendered conductive by conduction of Q10. The modulating coil SC upon energization will cause actuation of the modulating valve 24. Upon conduction of Q11 the positive side of the battery B is impressed across the coil SC through the emitter-collector circuit of Q11, through fuse F1 and through diode D18.

The fuse F1 is provided as part of a fail-safe circuit which includes the transistor Q12 and a controlled rectifier SCR1. The transsistor Q12 is of the NPN type and has its base connected to the emitter of Q9 and has its emitter connected to ground. The collector of Q12 is connected to the low voltage side of the fuse F1 via a biasing resistor R41. Q12 is normally not conductive and will be rendered conductive upon conduction of transistor Q9. Thus when transistor Q9 conducts resulting in the power transistor Q11 being turned "on," transistor Q12 will also be rendered conductive. However, in the event of a failure in the brake circuit in which power transistor Q11 fails in a shorted condition, the system would be improperly actuated as if a skid control signal had been received. However, transistor Q9 would be off in this situation and the transistor Q12 will not be conductive. The collector of transistor Q12 is connected to the gate electrode of the SCR1 which gate is connected to ground via a bypass capacitor C17 (to prevent unwanted firing of SCR1 by transients). The principal electrodes of SCR1 are connected from the high voltage side of fuse F1 to ground. Under normal skid control conditions in which Q12 and Q11 are conductive, with Q12 conducting the gate of the SCR1 will be brought to a near ground potential whereby SCR1 cannot conduct. Thus, under normal actuation of the output circuit section 42, SCR1 will be non-conductive; however, in the event of failure of transistor Q11 which would provide for unwanted energization of the valve coil SC, transistor Q12 will not be conductive since transistor Q9 is not conductive. In this condition the gate of SCR1 will not be at ground and SCR1 will be rendered conductive. SCR1 provides a substantially low impedance current path through the fuse F1 to ground whereby the fuse F1 will be blown. With fuse F1 opened the modulating valve coil SC cannot be energized, the valve 24 will be disabled and normal braking of the vehicle by the vehicle operator will be permitted.

A light L provides a signal to the vehicle operator that there has been a failure in the circuit. A transistor Q13 is an NPN type having its base connected to the emitter of Q11 via a biasing resistor R40 and has its collector connected to one side of the brake failure indicating light L which has its other side normally connected to the positive side of battery B. The emitter of the transistor Q13 is connected to the anode of the diode D18, while the base Q13 is also connected to the positive side of the battery B, via biasing resistors R39 and R40. With Q13 non-conductive, the light L will not be connected to a return ground path. Upon failure of fuse F1, the resultant conduction of SCR1 will cause Q13 to conduct, providing for a ground path for light L and an indication to the vehicle operator of a failure in the skid control circuit. It is desirable to cycle the valve 24 from time to time to prevent seals from losing their effectiveness.

In order to provide for valve cycling, the valve coil SC is connected to starter solenoid contacts SS1 of the vehicle via a diode D1 such that upon each actuation of the starter solenoid and closing of the contacts SS1 the coil SC will be energized thereby permitting the valve 24 to cycle. A Zener diode D3 and diode D2 are connected from the plus side of the modulating coil SC to ground to act as a suppressor.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:
1. In a skid control system for controlling fluid pressure actuated brakes of at least one wheel of a wheeled vehicle by controlling the fluid pressure to the brakes via a modulating valve actuated by a control signal, the invention comprising control circuit means for providing the control signal, said control circuit means including output circuit means for providing the control signal in response to an input signal having a preselected magnitude and input signal means electrically connected with said output circuit means for providing said input signal and for varying the magnitude of said input signal in accordance with representative variations in magnitude of the angular deceleration rate of the wheel, the magnitude of said input signal for substantially any one angular deceleration rate of the wheel varying with the representative magnitude wheel angular velocity.

2. The system of claim 1 with the variation in magnitude of said input signal being such that for substantially any one angular deceleration rate of the wheel the magnitude of said input signal decreases with increases in wheel angular velocity.

3. The system of claim 2 with said input signal means providing a velocity signal having a magnitude varying in a non-linear manner in accordance with variation in the magnitude of the angular wheel velocity.

4. The system of claim 3 with said velocity signal increasing in magnitude in accordance with increases in the angular wheel velocity with the amount of increase of said velocity signal diminishing with increasing wheel angular velocity.

5. The system of claim 4 with said input signal varying in magnitude in accordance with the rate of change in magnitude of said velocity signal.

6. The system of claim 5 with said input signal means providing a plurality of signal pulses representative of the wheel angular velocity with each of said signal pulses being of similar wave form and of the same amplitude, said input signal means including signal shaping means responsive to said signal pulses for providing shaped pulses varying in amplitude with variations in frequency.

7. The system of claim 6 with said signal pulses being a square wave and with said shaped pulses having a trailing edge gradually decreasing in amplitude with the width of said trailing edge varying with variations in frequency.

8. The system of claim 7 with said signal shaping means including a first capacitor with the magnitude of the charge in said first capacitor varying with variation in the width of said trailing edge.

9. The system of claim 8 with the width of said trailing edge decreasing with increase in frequency of said signal pulses.

10. The system of claim 9 with said input signal means including integrator circuit means for providing said velocity signal in response to the charge on said first capacitor.

11. The system of claim 10 with said integrator circuit means including a second capacitor with the charge on said second capacitor varying in magnitude with the magnitude of charge on said first capacitor and with the frequency of said shaped pulses.

12. The system of claim 11 with the magnitude of potential on said second capacitor varying non-linearly with increases in the frequency of said shaped pulses.

13. The system of claim 12 with said input signal means including differentiating circuit means for providing said input signal in accordance with the time rate of change of the magnitude of charge on said first capacitor.

14. The system of claim 1 with said input signal means including signal shaping means for providing shaped pulses varying in frequency with the wheel angular velocity and varying in amplitude with variation in frequency.

15. The system of claim 14 with said shaped pulses having a gradually shaping trailing edge with the width of said trailing edge varying with variation in frequency.

16. The system of claim 1 with said input signal means including a first capacitor with the magnitude of charge on said first capacitor varying slightly with variation in frequency whereby said input signal for any one angular deceleration rate of the wheel will vary with the representative wheel angular velocity.

17. The system of claim 16 with said input signal means including a second capacitor, said first capacitor having a charge occurring repetitively generally in accordance with wheel angular velocity, said second capacitor having the magnitude of its charge vary in accordance with the frequency of repetition of the charge on said first capacitor and in accordance with variations in the magnitude of the charge on said first capacitor.

18. The system of claim 17 with the charge on said second capacitor being generally a continuous curve.

19. The system of claim 13 with said input circuit means comprising squaring circuit means for providing said square wave in response to a generally sine wave input, said squaring circuit means comprising a first transistor having a first control electrode and a first pair of principal electrodes, a first voltage divider connected across said first control electrode, a coupling capacitor connected to said first control electrode to transmit the sine wave input thereto, means applying a potential difference across said first principal electrodes and said first voltage divider, means connecting the output of said first transistor at one of said first principal electrodes to said signal shaping means, said signal shaping means comprising a first resistor serially connected with said first capacitor to provide a long RC charge time constant of a preselected magnitude, a first diode connected to said first resistor, circuit means connecting said first diode, first resistor and first capacitor with said first diode being in a closed circuit condition on alternate half cycles of said square wave and being in an open circuit condition on opposite half cycles with the potential across said resistor being shaped pulses, said integrator circuit means comprising said second capacitor, a second diode circuit means connecting said second diode and said second capacitor to said first resistor with said second diode being in an open circuit condition on alternate half cycles of said shaped pulses and being in a closed circuit condition on opposite half cycles with said first capacitor transferring charge to said second capacitor on said opposite half cycles for said square wave and said shaped pulses, means connected to said second capacitor for providing a faster charge time than discharge time, amplifying means connected to said second capacitor for providing said velocity signal in response to the potential in said second capacitor, gate circuit means for providing said input signal in response to the rate of change of said velocity signal and including means for differentiating said velocity signal, said output circuit means comprising means providing a fixed threshold potential and means responsive to a preselected magnitude of said input signal relative to the magnitude of said threshold for providing the control signal.

20. In a skid control system for controlling fluid pressure actuated brakes of at least one wheel of a wheeled vehicle by controlling the pressure to the brakes via valve means actuated by a control signal, the invention comprising control circuit means for providing the control signal in response to a predetermined, representative magnitude of the deceleration rate of the wheel with said magnitude of the deceleration rate for providing the control signal increasing with increasing wheel angular velocity.

21. The skid control system of claim 20 with the variation in deceleration rate over the speed range of the wheel being at least around 4 to 1.

22. In a skid control system for controlling fluid pressure actuated brakes of at least one wheel of a wheeled vehicle by controlling the pressure to the brakes via valve means actuated by a control signal, the invention comprising control circuit means for providing the control

PO-1050
(5/69)

UNITED STATES PATENT OFFICE
CERTIFICATE OF CORRECTION

Patent No. 3,511,542            Dated May 12, 1970

Inventor(s) Anthony C. Fielek, Jr.

It is certified that error appears in the above-identified patent and that said Letters Patent are hereby corrected as shown below:

Column 7, line 55, delete "is" first occurrence and substitute therefor --of--

Column 10, line 37, after "being" insert --said--

SIGNED AND
SEALED
SEP 1 - 1970

(SEAL)
Attest:

Edward M. Fletcher, Jr.            WILLIAM E. SCHUYLER, JR.
Attesting Officer            Commissioner of Patents